United States Patent
Kanoh

(10) Patent No.: US 7,136,933 B2
(45) Date of Patent: Nov. 14, 2006

(54) INTER-PROCESSOR COMMUNICATION SYSTEMS AND METHODS ALLOWING FOR ADVANCE TRANSLATION OF LOGICAL ADDRESSES

(75) Inventor: Yasushi Kanoh, Tokyo (JP)

(73) Assignee: NEC Corporation, Tokyo (JP)

( * ) Notice: Subject to any disclaimer, the term of this patent is extended or adjusted under 35 U.S.C. 154(b) by 916 days.

(21) Appl. No.: 10/161,636

(22) Filed: Jun. 5, 2002

(65) Prior Publication Data
US 2003/0005071 A1 Jan. 2, 2003

(30) Foreign Application Priority Data
Jun. 6, 2001 (JP) .............................. 2001-170377

(51) Int. Cl.
G06F 13/00 (2006.01)
(52) U.S. Cl. ..................................................... 709/245
(58) Field of Classification Search ................ 709/245
See application file for complete search history.

(56) References Cited

U.S. PATENT DOCUMENTS

| | | | |
|---|---|---|---|
| 5,978,894 A | 11/1999 | Sukegawa et al. | |
| 6,101,551 A | * 8/2000 | Kanoh ........................ | 709/245 |
| 6,353,879 B1 | 3/2002 | Middleton et al. | |
| 6,678,722 B1 | 1/2004 | Kanoh | |
| 2003/0024839 A1 | 2/2003 | Fulda | |
| 2003/0033431 A1 | 2/2003 | Shiinomiya | |

FOREIGN PATENT DOCUMENTS

| | | |
|---|---|---|
| JP | 60-205648 A | 10/1985 |
| JP | 62-251943 A | 11/1987 |
| JP | 01-226055 A | 9/1989 |
| JP | 05-088983 A | 4/1993 |
| JP | 05-089056 A | 4/1993 |
| JP | 05-181751 A | 7/1993 |
| JP | 06-019785 A | 1/1994 |
| JP | 08-241293 A | 9/1996 |
| JP | 09-212474 A | 8/1997 |
| JP | 10-275129 A | 10/1998 |
| JP | 11-203260 A | 7/1999 |
| JP | 11-345199 A | 12/1999 |
| JP | 2000-040029 A | 2/2000 |
| JP | 2000-067009 A | 3/2000 |
| JP | 2000-330960 A | 11/2000 |
| JP | 2003-050743 A | 2/2003 |

OTHER PUBLICATIONS

Kanō, Takeshi, and four others, "The User-Level Message Communications Mechanism of Parallel Computer Cenju-4," Parallel Processing Symposium JSPP '99 Collected Papers, Japan, Information Processing Society of Japan (Corp.), Jun. 9, 1999, p. 7-14.

(Continued)

Primary Examiner—Robert B. Harrell
(74) Attorney, Agent, or Firm—Foley & Lardner LLP

(57) ABSTRACT

A transmitter 43 transmits a write address (i.e., address translation packet before sending the first data packet of a command). A receiver 5, when receiving the address translation packet, executes address translation of a write address. The receiver 5 also preliminarily executes address translation in advance during inter-processor communication for reducing overhead of address translation in the destination processor that occurs for each page. The transmitter reports the total number of pages in advance for suppressing wasteful address translation subsequent to the last page.

19 Claims, 5 Drawing Sheets

OTHER PUBLICATIONS

Matsuoka, Hiroshi, and seven others, "The Memory Structure of the Massively Parallel Processing Computer RWC-1," Information Processing Society Research Report, Japan, Information Processing Society of Japan (Corp.), Aug. 19, 1993, vol. 93, No. 71, (93-ARC-101), p. 17-24.

Kunisawa, Ryōta, and two others, "A Performance Evaluation of Memory-Based Communications Supported by Address Conversion Hardware," Institute of Electronics, Information and Communication Engineers Research Report, Japan, Institute of Electronics, Information and Communication Engineers, Aug. 4, 1998, vol. 98, No. 233 (CPSY98-48-59), p. 61-66.

Nakajō, Hironori, and three others, "A Performance Evaluation of Consistency Protocols in a Virtual Shared Memory System for Parallel Computers in a Combined Network, and Their Realization Through Hardware," Parallel Processing Symposium JSPP '91 Collected Papers, Japan, Information Processing Society of Japan (Corp.), May 1991, p. 45-52.

Shimizu, Kentarō, "Fundamental Knowledge of Distributed Processing & Distributed OS," Interface, Japan, CQ Publishing Co., Ltd., Oct. 1, 1991, vol. 17, No. 10, p. 124-139.

Kudō, Tomohiro, and four others, "An Evaluation of Network Interface for Network-Based Parallel Computing," Institute of Electronics, Information and Communication Engineers Research Report, Japan, Institute of Electronics, Information and Communication Engineers, Aug. 5, 1998, vol. 98, No. 234, (CPSY98-60-73), p. 1-8.

Date, Shin'ya, and eight others, "High-Speed Communications Mechanisms that Realize Computer Colonies," Information Processing Society Research Report, Japan, Information Processing Society of Japan (Corp.) Aug. 4, 1999, vol. 99, No. 251, (CPSY99-47-61), p. 41-48.

Creve Maples, "A High-Performance, Memory-Based Interconnection System for Multicomputer Environments," Proceedings of Supercomputing '90, IEEE, Nov. 12, 1990, pp. 295-304.

* cited by examiner

INTER-PROCESSOR COMMUNICATION SYSTEMS AND METHODS ALLOWING FOR ADVANCE TRANSLATION OF LOGICAL ADDRESSES

BACKGROUND OF THE INVENTION

This application claims the benefit of Japanese Patent Application No. 2001-170377 filed on Jun. 6, 2001, the contents of which are incorporated by reference.

The present invention relates to inter-processor communication systems and inter-processor communication methods used therefor and, more particularly, to an inter-processor communication method for a plurality of processors connected to a network, in which logical addresses are used as data read and write addresses.

In prior art inter-processor communication, the use of an erroneous data write address in a destination processor may causes system down condition in the destination processor. Accordingly, destination processor protection is provided by various means.

As an example, a received data buffer area is determined to permit writing of data only in this area in the inter-process communication (this method is hereinafter referred to as the first prior art technique). In this case, the receiver in the destination processor limits a write address to a physical address determined by the receiver, or to a region which is obtained by masking a physical address designated by the source processor with a mask bit pattern determined by the receiver.

As a different example, the source processor designates the write address not as a physical address but as a logical address (this method is hereinafter referred to as the second prior art technique). In this case, the receiver in the destination processor executes the translation of the write address from a logical address to a physical address. In this method, the physical address obtained by address translation in the receiver can be limited to be in a particular address range, and it is thus possible to protect the destination processor. However, if the designated write address is invalid, it would result in failure of the address translation.

In the above first prior art technique, because copying of data from the received data buffer area to a user's area is necessary, it causes degraded throughput performance and latency performance of the inter-processor communication. Accordingly, the second prior art technique method is frequently used, in which the write address is designated as a logical address.

In the second prior art technique, however, a means for translating the designated logical address to a physical address is necessary. This address translation is needed for each page, and the normal page size is 4 Kbytes. Therefore, transmission of a large quantity of data in the inter-processor communication requires a very large address translation table, which cannot be fully held in the receiver. Accordingly, the full address translation table is mounted in the main memory, and the receiver reads part of the table from the main memory as desired for the address translation.

This means that the address translation gives rise to access to the main memory, thus leading to overhead in the inter-processor communication. Particularly, when the main memory is accessed for address translation at the time of packet reception, the writing of packet data can be executed only after the address translation. Until the end of the address translation, therefore, the receiver cannot read data from the network. This has bad effects on other inter-processor communication as well. For improving the inter-processor communication performance, it is thus necessary to reduce such overhead.

The above prior art inter-processor communication has a problem that when the write address in the destination processor is designated as logical address in the parallel computer system, it is difficult to reduce or conceal the overhead in the address translation in the receiver.

SUMMARY OF THE INVENTION

An object of the present invention, accordingly, is to provide an inter-processor communication system and an inter-processor communication method used therefor, which permit reduction or concealment of the address translation overhead in the receiver.

According to an aspect of the present invention, there is provided an inter-processor communication system of parallel computer in which a plurality of processors are connected by a network, each processor including: a transmitting means for transmitting a packet for requesting address translation of a write address in a destination processor as designated by logical address to the destination processor when transmitting data thereto; a means for translating a write address transmitted from the source processor to a physical address; and a means for using the result of the address translation as a write address for writing data transmitted subsequent to the packet for requesting the address translation.

The transmitting means transmits a packet for requesting address translation of the write address to the destination processor before translating the read address of the transmission data as designated by the logical address to physical address. The write address is designated in the packet for transmitting the transmission data therein, and when a write address added to the previously transmitted packet for requesting the address translation and the write address designated by the packet for transmitting the transmission data therein are different, the write address designated in the packet for transmitting the transmission data therein is re-translated for use.

According to another aspect of the present invention, there is provided an inter-processor communication system of parallel computer in which a plurality of processors are connected by a network, each processor including: a means for translating a write address in a destination processor as designated by logical address to physical address at the time of packet reception in the destination processor; a means for storing the result of the write address translation; and a means for executing subsequently necessary write address translation in advance before the write address translation result stored earlier becomes incapable of being used.

According to another aspect of the present invention, there is provided an inter-processor communication system of a parallel computer in which a plurality of processors are connected by a network, each processor including: a means for translating a read address of transmission data designated by a logical address to a physical address when transmitting data to the destination processor; and a means for storing the result of the read address translation, and a means for executing subsequently necessary read address translation in advance before the read address translation result stored earlier becomes incapable of being used.

According to still another aspect of the present invention, there is provided an inter-processor communication system of a parallel computer in which a plurality of processors are connected by a network, each processor including: a means for translating a write address in a destination processor as designated by a logical address to a physical address at the time of packet reception in the designation processor; a means for storing the result of the write address translation; a means for executing subsequently necessary write address translation in advance before the write address translation result stored earlier becomes incapable of being used; a means for translating a read address of transmission data designated by a logical address to a physical address at the time of data transmission to the destination processor; a means for storing the result of the read address translation; and a means for executing subsequently necessary read address translation before the stored read address translation result becomes incapable of being used, wherein the write address is designated in the packet for transmitting the transmission data therein, and when a write address added to the previously transmitted packet for requesting the address translation and the write address designated by the packet for transmitting the transmission data therein are different, the write address designated in the packet for transmitting the transmission data therein is re-translated for use. When data are transmitted in a plurality of packets under control of a communication command, a packet for requesting the address translation is transmitted only right before the first packet for transmitting the transmission data pertaining to the command, and subsequently only the packets for transmitting the transmission data are transmitted. The storing means for storing the write address translation result manages the write address translation result for each source processor, and stores two write address translation results, i.e., one being in use and the other one obtained by in-advance address translation, for the same source processor. A packet for requesting the address translation has the total number of pages in the destination processor of data transmitted under control of the command, and the destination processor counts down the pages to predict the last page to be written under control of the command, thus suppressing wasteful in-advance address translation subsequent to the last page.

According to a further aspect of the present invention, there is provided an inter-processor communication method of a parallel computer in which a plurality of processors are connected by a network, each processor including steps of: a step for transmitting a packet for requesting address translation of a write address in a destination processor as designated by a logical address to the destination processor when transmitting data thereto; a step for translating a write address transmitted from the source processor to a physical address; and a step for using the result of the address translation as a write address for writing data transmitted subsequent to the packet for requesting the address translation.

The transmitting step transmits a packet for requesting address translation of the write address to the destination processor before translating the read address of the transmission data as designated by the logical address to physical address. The write address is designated in the packet for transmitting the transmission data therein, and when a write address added to the previously transmitted packet for requesting the address translation and the write address designated by the packet for transmitting the transmission data therein are different, the write address designated in the packet for transmitting the transmission data therein is re-translated for use.

According to a still further aspect of the present invention, there is provided an inter-processor communication method of a parallel computer in which a plurality of processors are connected by a network, each processor including steps of: a step for translating a write address in a destination processor as designated by a logical address to a physical address at the time of packet reception in the destination processor; a step for storing the result of the write address translation; and a step for executing subsequently necessary write address translation in advance before the write address translation result stored earlier becomes incapable of being used.

According to another aspect of the present invention, there is provided an inter-processor communication method of a parallel computer in which a plurality of processors are connected by a network, each processor including steps of: a step for translating a read address of transmission data designated by a logical address to a physical address when transmitting data to the destination processor; and a step for storing the result of the read address translation, and a means for executing subsequently necessary read address translation in advance before the read address translation result stored earlier becomes incapable of being used.

According to still another aspect of the present invention, there is provided an inter-processor communication method of a parallel computer in which a plurality of processors are connected by a network, each processor including steps of: a step for translating a write address in a destination processor as designated by a logical address to a physical address at the time of packet reception in the designation processor; a step for storing the result of the write address translation; a step for executing subsequently necessary write address translation in advance before the write address translation result stored earlier becomes incapable of being used; a step for translating a read address of transmission data designated by a logical address to a physical address at the time of data transmission to the destination processor; a step for storing the result of the read address translation; and a step for executing subsequently necessary read address translation before the stored read address translation result becomes incapable of being used, wherein the write address is designated in the packet for transmitting the transmission data therein, and when a write address added to the previously transmitted packet for requesting the address translation and the write address designated by the packet for transmitting the transmission data therein are different, the write address designated in the packet for transmitting the transmission data therein is re-translated for use.

When data are transmitted in a plurality of packets under control of a communication command, a packet for requesting the address translation is transmitted only right before the first packet for transmitting the transmission data pertaining to the command, and subsequently only the packets for transmitting the transmission data are transmitted. The storing step for storing the write address translation result manages the write address translation result for each source processor, and stores two write address translation results, i.e., one being in use and the other one obtained by in-advance address translation, for the same source processor. A packet for requesting the address translation has the total number of pages in the destination processor of data transmitted under control of the command, and the destination processor counts down the number of pages in order to predict the last page to be written under control of the command, thus suppressing wasteful in-advance address translation subsequent to the last page.

More specifically, in a first inter-processor communication system according to the present invention, when the write address in the destination processor is designated by the logical address, a packet for requesting in-advance address translation is transmitted for the execution of address translation of the write address in the destination processor in advance. When the read address is also designated by logical address, the packet for requesting the in-advance address translation is transmitted before translating the read address in order to permit early start of the in-advance write address translation in the destination processor.

In a second inter-processor communication system according to the present invention, it is made possible to execute address translation of write addresses of transmitted data in advance. Thus, the address translation occurring during data transfer of a command is executed in advance for concealing overhead in address translation of write address in the destination processor.

In a third inter-processor communication system according to the present invention, when the read address is also designated by logical address, it is made possible to execute address translation of read addresses of the transmission data in advance. Thus, the overhead of address translation of read address occurring during data transfer of a command is concealed.

In a fourth inter-processor communication system according to the present invention, it is made possible to execute address translation of read and write addresses in advance, thus concealing overhead of address translation of read and write addresses during data transfer of a command. When a command is transmitted as a plurality of packets, the only packet for requesting address translation of write address is transmitted before packets for transmitting the transmission data to permit execution of the address translation of the write address before data arrival. The results of address translation of write addresses are managed for individual source processors, so that the result of address translation of the write address of packets transmitted by a certain processor will not be destroyed by packets from different processors. Furthermore, the packet for requesting address translation is transmitted by adding the total number of pages of data write area, so that the in-advance translation of write addresses is executed only up to the last page and not unnecessarily executed. In this way, necessary address translation is prevented from being interfered by wasteful address translation.

As shown above, before address translation of read address of the transmission data for the transmitter of transmitting side processor and data read, the address translation of the write address is executed in advance in the receiver of the destination processor. Owing to this, no address translation has to be executed at the data arrival time in the destination processor. Thus, in the inter-processor communication with write addresses designated by logical addresses, it is possible to reduce the time necessary for the address translation in the receiver of the destination processor.

Furthermore, in the case without application of the present invention, for reducing the address translation time in the receiver of the destination processor, it is necessary to hold the full address translation table in the receiver. According to the present invention, by executing the address translation in advance and storing only the result, it is possible to use the result at the data arrival time, thus permitting reduction of the capacity of the storing means for holding the address translation result.

Moreover, in case when data of a plurality of pages are transmitted under control of a command, by executing the address translation of read and write addresses in advance, the inter-processor communication is now free from being interrupted by address translation. It is thus possible to reduce or conceal overhead of address translation in the receiver.

Other objects and features will be clarified from the following description with reference to attached drawings.

PREFERRED EMBODIMENTS OF THE INVENTION

Preferred embodiments of the present invention will now be described with reference to the drawings.

Figure 1:
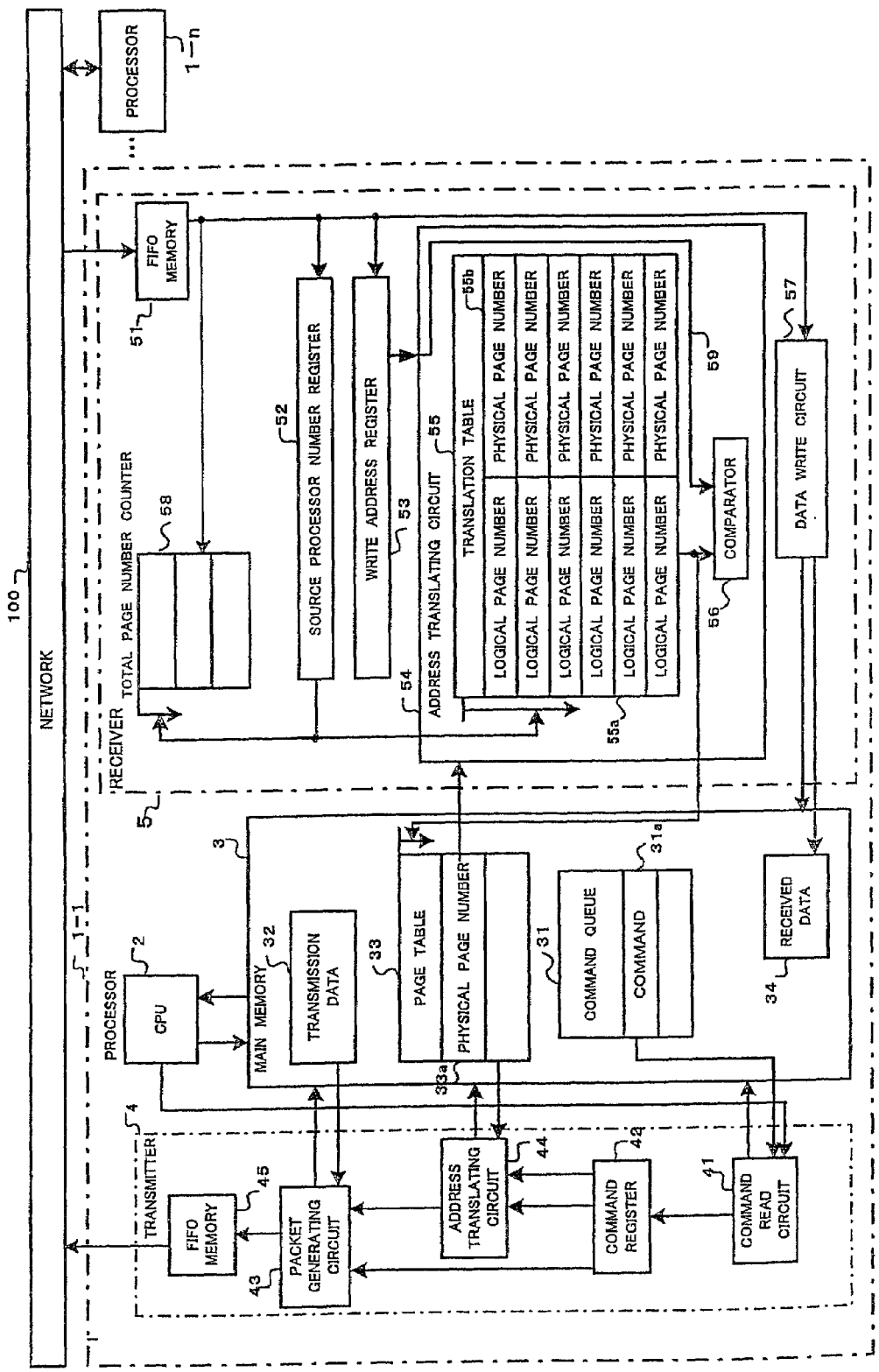
FIG. 1 is a block diagram to illustrate an inter-processor communication system as an embodiment of the present invention.

FIG. 1 is a block diagram to illustrate an inter-processor communication system as an embodiment of the present invention. Referring to FIG. 1, the embodiment of the inter-processor communication system according to the present invention constitutes a parallel computer comprising a plurality of processors 1-1 to 1-n connected to a network 100. The processors 1-1 to 1-n each includes a CPU 2, a main memory 3, a transmitter 4 and a receiver 5.

The transmitter 4 includes a command read circuit 41, a command register 42, a packet generating circuit 43, an address translating circuit 44, and a FIFO (First-In First-Out) memory 45.

The command read circuit 41 reads out, in response to a transmission request from the CPU 2, a command 31a from a command queue 31 provided in the main memory 3, checks the contents of the command 31a, and if detecting no error, stores the command 31a in the command register 42.

The packet generating circuit 43 translates a read address written in the command 31a stored in the command register 42 from a logical address to a physical address by using the address translating circuit 44. The packet generating circuit 43 generates a header of a packet by using information stored in the command register 42 like a destination processor and so on.

The packet generating circuit 43 requests the main memory 3 to read data from the physical read address obtained by the translation in the address translating circuit 44, and causes the read data to be transmitted as a packet to the network 100. The circuit 43 also generates an address translation packet from destination processor's write address in the command register 42, and transmits the generated packet to the network 100.

The address translating circuit 44 translates the read address in the command register 42 from a logical address to a physical address. The circuit 44 executes this translation with reference to data of a page table 33 in the main memory 3. The FIFO memory 45 is interposed between the network 100 and the packet generating circuit 43 to serve to change data width and to generate error detection codes, etc.

The receiver 5 includes a FIFO memory 51, a source processor number register 52, a write address register 53, an address translating circuit 54, a data write circuit 57 and a total page number counter 58.

The FIFO memory 51 temporarily stores packets transmitted from the network 100. The source processor number register 52 stores the processor number of the processor that transmitted the packet and the processor number is contained in the header of the packet. The write address register 53 stores a write address, which is contained in the header of a packet for writing the data of that packet.

The address translating circuit 54 translates the write address in the write address register 53 from a logical address to a physical address, and provides the physical write address for the data write circuit 57. The address translating circuit 54 has a translation table 55, in which a correspondence table relating logical page numbers 55a and physical page numbers 55b to one another is stored. The translation table 55 is re-written with reference to values in a page table 33 in the main memory 3. The address translating circuit 54 reads out a logical page number 55a in a translation table 55 by using the source processor number in the source processor number register 52, and it has a comparator 56, which compares the read logical page number 55a and the logical page number 59 in the write address register 53.

The data write circuit 57 writes received data 34 transmitted as packet in the physical write address in the main memory 3 that has been outputted from the address translating circuit 54. The total page number counter 58 stores the total number of pages in a destination processor of data transmitted in response to one command, and reduces the stored number by one whenever address translation of one page is completed, so that address translation of pages subsequent to the last page is not made in advance. The counter 58 counts pages for each source processor.

Figure 2:
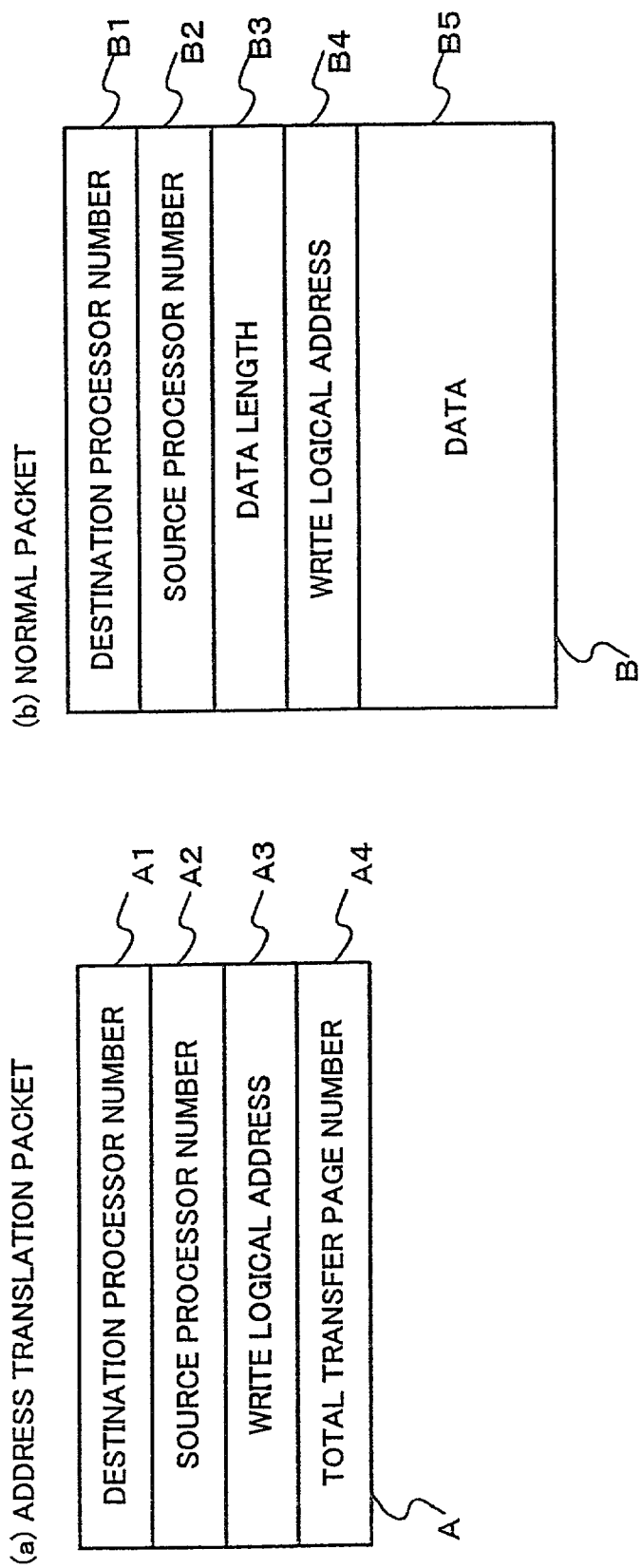
FIGS. 2(a) and 2(b) represent format diagrams of an address translation packet and a normal packet used in one embodiment of the present invention.

FIG. 2(a) represents the format diagram of an address translation packet used in one embodiment of the present invention, and FIG. 2(b) represents the format diagram of a normal packet used in one embodiment of the present invention. That is, FIGS. 2(a) and 2(b) show two different kinds of packets for communication in one embodiment of the inter-processor communication system according to the present invention.

Address translation packet A comprises destination processor number A1, source processor number A2, write logical address A3 and total transfer page number A4. The destination processor number A1 is used for routing in the network 100, and the total transfer page number A4 is the total number of pages of written data transmitted in response to one command.

Normal packet B comprises destination processor number B1, source processor number B2, data length B3, write logical address B4 and data B5. By the term "data length B3" is meant the length of data transmitted in the packet.

Figure 3:
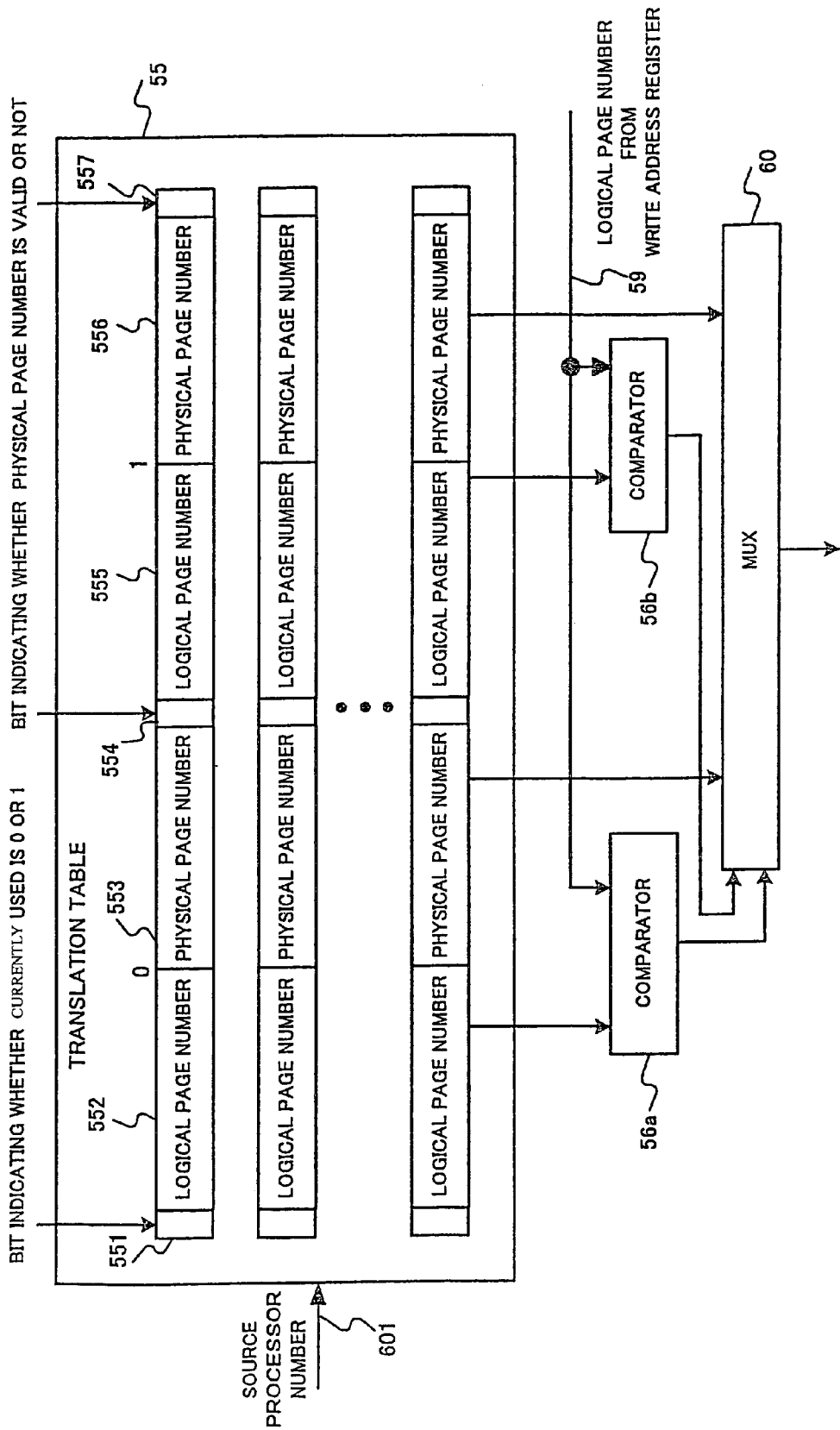
FIG. 3 is a diagram to illustrate details of the address translation table 55 shown in FIG. 1.

FIG. 3 is a diagram to illustrate details of the address translation table 55 shown in FIG. 1. Referring to the Figure, the address translation table 55 can store two pairs of logical page numbers and physical page numbers 552 and 555, and 553 and 556 for each source processor number. Bits 554 and 557 which indicate whether the physical page number is valid are added to these pairs, respectively. Furthermore the table 55 has a bit 551 which indicates which pair is in use for each source processor number. The in-advance address translation result is stored in the pair of a logical page number and a physical page number indicated by the bit 551 to be out of use.

The two logical page numbers selected by the source processor number 601 from the address translation table 55 are compared in comparators 56a and 56b, respectively, with logical page number 59 from the write address register 53, and the results are used for physical address selection in an MUX (multiplexer) 60.

The normal address translation process is as follows. The two logical page numbers 552 and 555 selected by the source processor number 601 are compared with the logical page number 59 from the write address register 52. If the same logical page number is present, the MUX 60 selects the appropriate one of the two physical address numbers 553 and 556 also selected by the source processor number 601 for address translation.

If the bit 554 or 557 indicates the selected physical page number is invalid, it means that the physical address is reading from the page table 33 on the main memory 3 now. Therefore the address translation is done after reading data from the page table 33. If the physical page number selected by the MUX 60 is in the different pair from the pair indicated by the bit 551, the bit 551 is re-written in order to indicate that this pair is in use.

If both the logical page numbers 552 and 555 are different from the logical page number 59, the page table 33 should be accessed. Where the address translation is executed in advance according to the present invention, this does not take place.

The in-advance address translation process will now be described. The processor 1-1 writes the logical page number 59 outputted from the written address register 53 in one of the two logical page numbers 552 and 555 selected by the source processor number 601 which is out of use, as indicated by the bit 551. Subsequently, the processor 1-1 rewrites either one of the bits 554 and 557 which indicates whether the corresponding physical page number is valid in order to indicate the physical page number is invalid, then reads out the physical page number by accessing the page table 33 on the memory 3, writes it in either one of the physical page number 553 and 556 and makes either one of the effective bits 554 and 557 valid.

Figure 4:
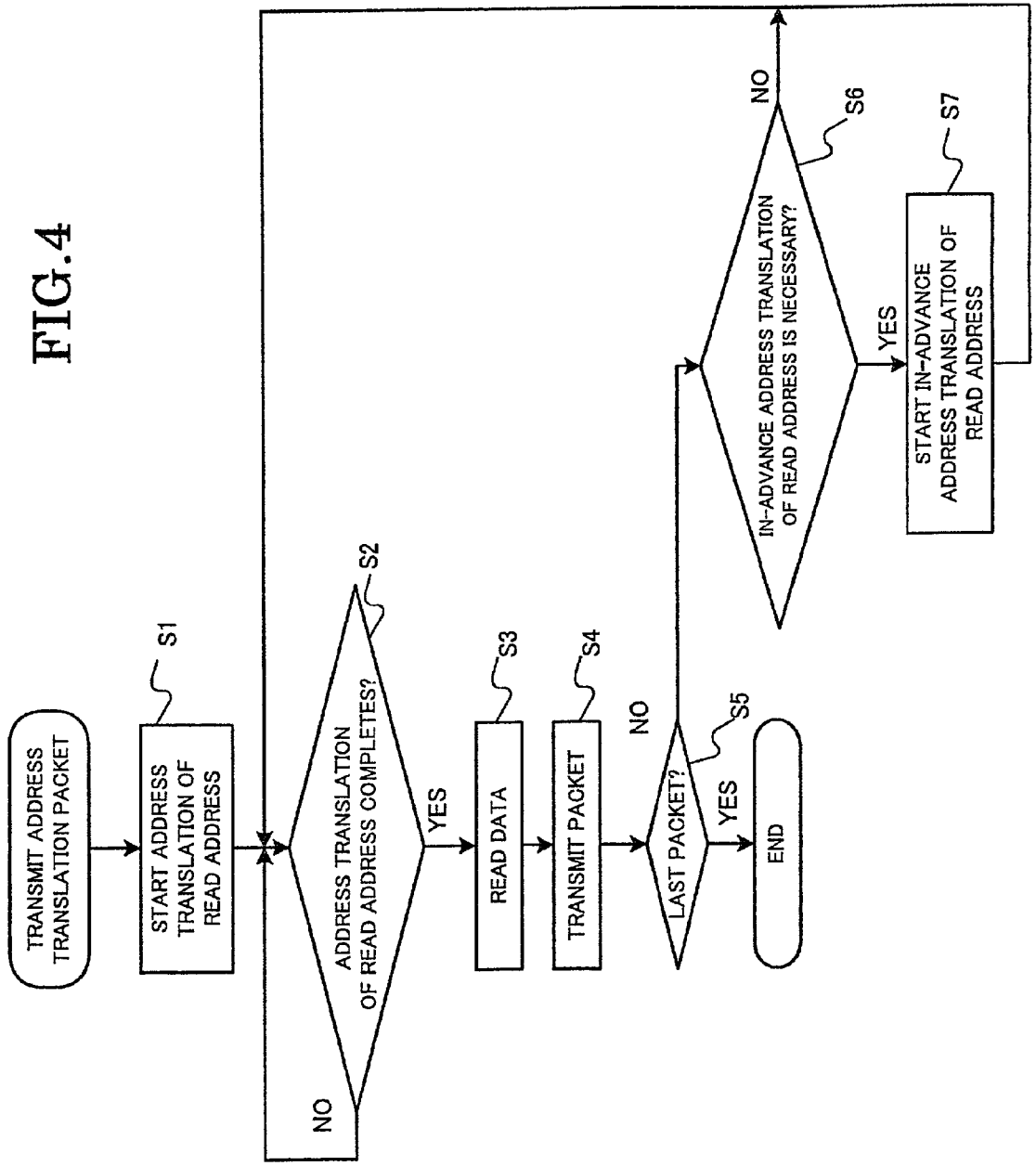
FIG. 4 is a flow chart illustrating a command processing routine in a source processor in the embodiment.
Figure 5:
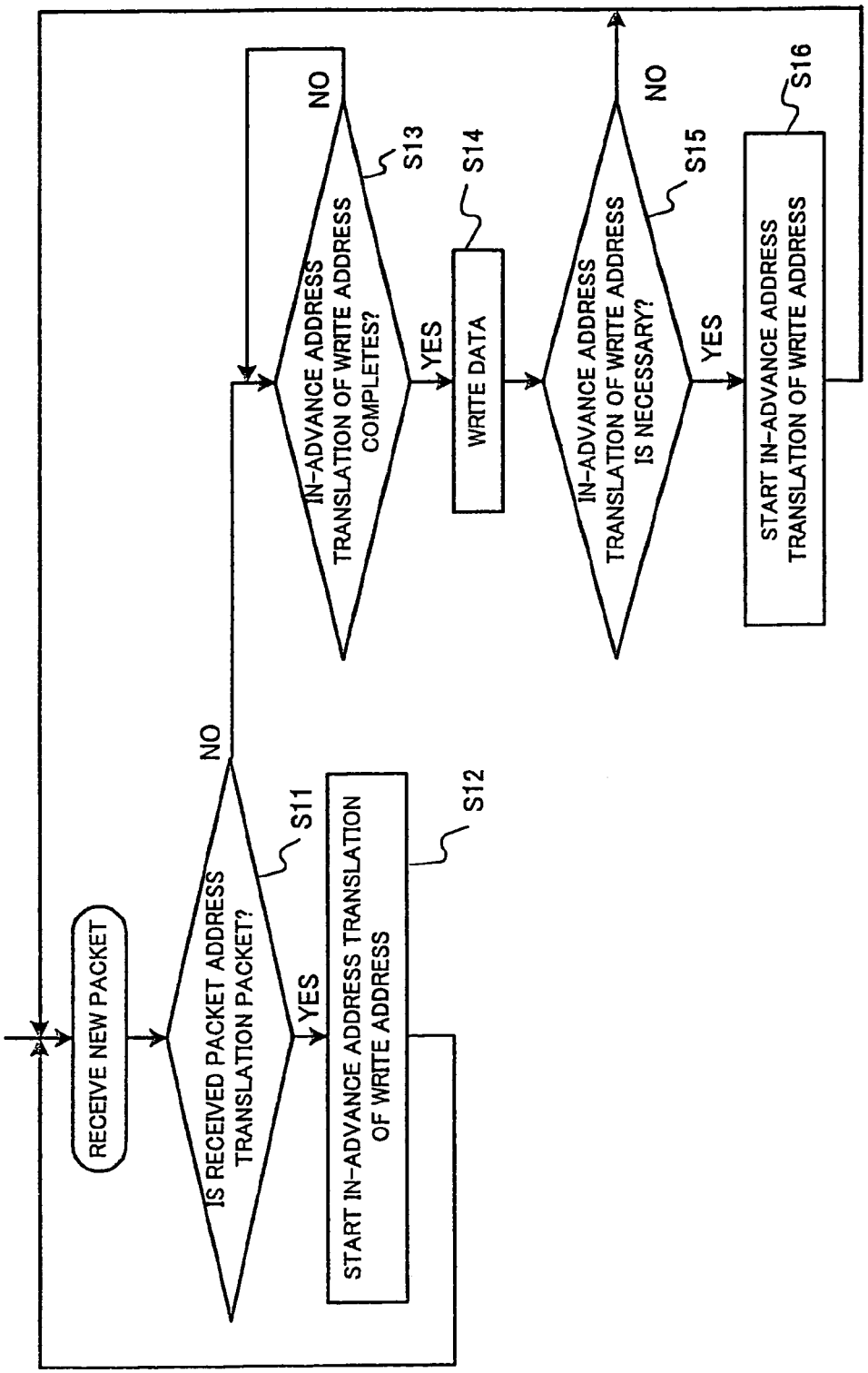
FIG. 5 is a flow chart illustrating a packet processing routine in the destination processor in the embodiment of the present invention.

FIG. 4 is a flow chart illustrating a command processing routine in a source processor in an embodiment. FIG. 5 is a flow chart illustrating a packet processing routine in the destination processor in one embodiment of the present invention. The command and packet processing routines in one embodiment of the present invention will now be described with reference to FIGS. 1 to 5.

In command processing in the source processor, the processor 1-1 transmits write logical address A3 and total transfer page number A4 as address translation packet A to the destination processor.

Then, the processor 1-1 starts address translation of the read address (step S1 in FIG. 4), and waits for completion of the address translation of the read address (step S2 in FIG. 4).

When the processor 1-1 completes the address translation, it reads out data for one packet (step S3 in FIG. 4), and transmits one packet (step S4 in FIG. 4). When the transmitted packet is not the last packet (step S5 in FIG. 4), the processor 1-1 checks whether in-advance address translation of the read address is necessary (step S6 in FIG. 4). If the in-advance address translation of the read address is necessary, the processor 1-1 starts the in-advance address translation (step S6 in FIG. 4).

The processor 1-1 decides whether the in-advance address translation of the read address is necessary by checking whether the read address is close to the page boundary, and it starts the in-advance address translation at such timing that the in-advance address translation has been completed by the time the result thereof is necessary. This process is continued until completion of the transmission of the last packet of the command.

In packet processing in the destination processor, when the processor 1-1 receives a packet, it checks whether the packet is the address translation packet A (step S11 in FIG. 5). Since the first packet in one command is the address translation packet A, the processor 1-1 executes the in-advance address translation of the write address designated in the packet (step S12 in FIG. 5).

When normal packet is eventually transmitted (step S11 in FIG. 5), the processor 1-1 checks whether the in-advance address translation has been completed, and waits for the completion thereof (step S13 in FIG. 5). The check as to whether the in-advance address translation has been completed is executed by checking whether the physical page number is valid, in the address translation table shown in FIG. 3, which is selected by the source processor number and the write logical page number of the packet.

When the in-advance address translation is completed, the processor 1-1 writes data (step S14 in FIG. 5), and then checks whether the in-advance address translation is necessary (step S15 in FIG. 5). The in-advance address translation, like the address translation of the read address, is executed at such timing that it has been completed before arrival of the packet for using its result therefor. The in-advance address translation is done when and only when the total page number counter 58 indicates that the current page in use is other than the last page (step S16 in FIG. 5).

As has been shown, before a source processor translates a read address of transmitted data and reads the data, the source processor sends an address translation packet to the destination processor in order to request to translate the write address in advance. Thus, no address translation is necessary at the first normal packet with data arrival, and it is thus possible to reduce a time for address translation in the receiver 5 of the destination processor.

In addition, when the embodiment is not applied, for reducing the address translation time in the receiver of the destination processor, it is necessary to hold the full address translation table in the receiver. According to the present invention, the address translation is executed in advance, and only the in-advance translation result is stored. Thus, at the normal packet with data arrival time the result can be used, and the capacity of the storing means necessary for holding the address translation result can be reduced.

Furthermore, when plural pages of data are transmitted under control of one command, the address translation of read and write addresses is/are executed in advance. It is thus possible to obtain inter-processor communication without being interrupted by address translation. Thus, it is possible to reduce or conceal overhead of the address translation in the receiver 5.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

As has been described in the foregoing, according to the present invention, in the inter-processor communication system with a plurality of processors connected by a network as a parallel computer, when each of the processors transmits data to the destination processor, it transmits a packet for requesting address translation of a write address in the destination processor as designated by the physical address to the destination processor, the write address transmitted from the source processor is converted to the physical address, the result of the address translation is made to be the write address of data transmitted subsequent to the packet for requesting the address translation. In this way, it is possible to reduce or conceal overhead of the address translation in the receiver.

What is claimed is:

1. An inter-processor communication system in which a plurality of processors are connected by a network, each processor of the plurality of processors including:

a transmitting means for transmitting a packet to a destination processor of the plurality of processors for requesting address translation of a write address from a logical address to a physical address by the destination processor when transmitting transmission data to the destination processor, and for translating the logical address to a specific physical address to be used as a read address to read the transmission data from a memory;

a means for translating a particular write address from a particular logical address to a particular physical address as requested in a particular packet that is received from a source processor of the plurality of processors; and a means for using the particular physical address that results from the address translation as a specific write address for writing particular transmission data received subsequent to said particular packet to a particular memory;

wherein said transmitting means is configured to transmit said packet for requesting address translation to the destination processor before translating the logical address to the specific physical address to be used as the read address to read the transmission data from the memory.

2. The inter-processor communication system according to claim 1, wherein the means for translating is configured such that when the particular write received in said particular packet and a subsequent write address designated in a subsequent packet for transmitting at least a portion of the particular transmission data are different, the means for translating translates the subsequent write address designated in said subsequent packet for use by the means for using.

3. An inter-processor communication system in which a plurality of processors are connected by a network, each processor of the plurality of processors including:

a means for translating a write address from a logical address to a physical address after receiving a packet that includes the write address;

a means for storing the physical address that results from the write address translation;

a means for executing subsequently necessary write address translation in advance to obtain a second physical address to be used for writing a particular portion of received data to a memory before the stored physical address becomes incapable of being used for writing the received data to the memory;

a means for translating a read address of transmission data from a particular logical address to a particular physical address when transmitting the transmission data to a destination processor of the plurality of processors;

a means for storing the particular physical address that results from the read address translation; and a means for executing subsequently necessary read address translation in advance to obtain a third physical address to be used for reading a particular portion of the transmission data from a particular memory before the stored particular physical address becomes incapable of being used for reading the transmission data from the particular memory;

wherein the means for translating the write address is configured such that when the write address received in the packet and a subsequent write address designated in a subsequent packet that includes the received data therein are different, the means for translating the write address translates the subsequent write address designated in the subsequent packet for use in writing a subsequent portion of the received data to the memory.

4. The inter-processor communication system according to claim 3, wherein each processor of the plurality of processors further includes:

transmitting means for transmitting data, said transmitting means configured such that when specific transmission data are transmitted in a plurality of packets under control of a communication command, the transmitting means transmits a specific packet for requesting address translation of a specific write address for the specific transmission data only right before the transmitting means transmits a first packet for transmitting the specific transmission data pertaining to the command and the transmitting means subsequently transmits only packets for transmitting the specific transmission data until all of the specific transmission data have been transmitted.

5. The inter-processor communication system according to claim 4, wherein said means for storing the physical address that results from the write address translation for each processor of the plurality of processors manages the write address translation result for the processor, and stores two write address translation results, where one result is in use and a second result is obtained by in-advance address translation, for the processor.

6. The inter-processor communication system according to claim 5, wherein said packet for requesting the address translation has a total number of pages in the destination processor of data transmitted under control of the command, and the destination processor is configured to count down a number of pages in order to predict a last page to be written under control of the command, thus suppressing wasteful in-advance address translation subsequent to the last page.

7. An inter-processor communication method in a parallel computer, said parallel computer having a plurality of processors that are connected by a network, said method comprising:

translating a write address in a destination processor of the plurality of processors from a logical address to a physical address at a time of receiving a packet that includes the logical address at the destination processor;

storing, in the destination processor, the physical address that results from the write address translation;

executing, by the destination processor, subsequently necessary write address translation in advance to obtain a second physical address to be used for writing a particular portion of received data to a memory before the stored physical address becomes incapable of being used for writing the received data to the memory;

translating, by a source processor of the plurality of processors, a read address of transmission data from the logical address to a particular physical address at a time of transmitting the transmission data to the destination processor;

storing, by the source processor, the particular physical address that results from the read address translation; and executing, by the source processor, subsequently necessary read address translation in advance to obtain a third physical address to be used for reading a particular portion of the transmission data from a particular memory before the stored particular physical address becomes incapable of being used for reading the transmission data from the particular memory;

wherein, when the write address included in the packet and a subsequent write address included in a subsequent packet for transmitting the transmission data therein are different, the subsequent write address designated in the subsequent packet for transmitting the transmission data therein is translated for use in writing a subsequent portion of the transmission data to the memory.

8. The inter-processor communication method according to claim 7, wherein when the transmission data are transmitted in a plurality of packets under control of a communication command, said packet for requesting the address translation is transmitted only right before a first packet for transmitting the transmission data pertaining to the command, and subsequently only packets for transmitting the transmission data are transmitted.

9. The inter-processor communication method according to claim 8, wherein said step for storing the physical address that results from the write address translation comprises:

storing two write address translation results, where one result is in use and a second result is obtained by in-advance address translation, for the source processor.

10. The inter-processor communication method according to claim 9, wherein said packet for requesting the address translation has a total number of pages in the destination processor of data transmitted under control of the command, and the destination processor counts down a number of pages in order to predict a last page to be written under control of the command, thus suppressing wasteful in-advance address translation subsequent to the last page.

11. An inter-processor communication system in which a plurality of processors are connected by a network, each processor of the plurality of processors including:

a means for translating a write address from a logical address to a physical address after receiving a packet that includes the write address;

a means for storing the physical address that results from the write address translation; and a means for executing subsequently necessary write address translation in advance to obtain a second physical address to be used for writing a particular portion of received data to a memory before the stored physical address becomes incapable of being used for writing the received data to the memory.

12. The inter-processor communication system according to claim 11, wherein the means for executing is configured to execute the subsequently necessary write address translation in advance to obtain the second physical address to be used for writing the particular portion of the received data to the memory before the stored physical address is provided to the memory a final time for writing the received data to the memory.

13. An inter-processor communication system in which a plurality of processors are connected by a network, each processor of the plurality of processors including:
   a means for translating a read address of transmission data from a logical address to a physical address when transmitting the transmission data to a destination processor of the plurality of processors; and
   a means for storing the physical address that results from the read address translation; and
   a means for executing subsequently necessary read address translation in advance to obtain a second physical address to be used for reading a particular portion of the transmission data from a memory before the stored physical address becomes incapable of being used for reading the transmission data from the memory.

14. The inter-processor communication system according to claim 13,
   wherein the means for executing is configured to execute the subsequently necessary read address translation in advance to obtain the second physical address to be used for reading the particular portion of the transmission data from the memory before the stored physical address is provided to the memory a final time for reading the transmission data from the memory.

15. An inter-processor communication method in a parallel computer, said parallel computer having a plurality of processors that are connected by a network, said method comprising:
   transmitting a packet from a source processor of said plurality of processors to a destination processor of said plurality of processors for requesting address translation of a write address from a logical address to a physical address by the destination processor when the source processor is preparing to transmit transmission data to the destination processor;
   translating, by the source processor, the logical address to a specific physical address to be used as a read address to read the transmission data from a memory;
   transmitting, from the source processor to the destination processor, the transmission data read from the memory;
   translating, by the destination processor, said write address received from the source processor from the logical address to a particular physical address; and
   using, by the destination processor, the particular physical address that results from the address translation as a specific write address for writing the transmission data received subsequent to said packet to a particular memory;
   wherein the source processor transmits the packet for requesting address translation to the destination processor before translating the logical address to the specific physical address to be used as the read address to read the transmission data from the memory.

16. The inter-processor communication method according to claim 15, further comprising:
   translating, by the destination processor when the write address received in said packet and a subsequent write address designated in a subsequent packet for transmitting at least a portion of the transmission data are different, the subsequent write address to use the subsequent write address to write at least the portion of the transmission data to the particular memory.

17. An inter-processor communication method in a parallel computer, said parallel computer having a plurality of processors that are connected by a network, said method comprising:
   translating a write address in a destination processor of the plurality of processors from a logical address to a physical address at a time of receiving a packet that includes the logical address at the destination processor;
   storing, by the destination processor, the physical address that results from the write address translation; and
   executing, by the destination processor, subsequently necessary write address translation in advance to obtain a second physical address to be used for writing a particular portion of received data to a memory before the stored physical address becomes incapable of being used for writing the received data to the memory.

18. An inter-processor communication method in a parallel computer, said parallel computer having a plurality of processors that are connected by a network, said method comprising:
   translating, by a source processor of the plurality of processors, a read address of transmission data from a logical address to a physical address when transmitting the transmission data to a destination processor of the plurality of processors; and
   storing, by the source processor, the physical address that results from the read address translation; and
   executing, by the source processor, subsequently necessary read address translation in advance to obtain a second physical address to be used for reading a particular portion of the transmission data from a memory before the stored physical address becomes incapable of being used for reading the transmission data from the memory.

19. A computer, comprising:
   a plurality of processors, each processor of the plurality of processors comprising:
      a) a transmitter for transmitting a packet to a destination processor of the plurality of processors for requesting address translation of a write address from a logical address to a physical address by the destination processor when transmitting transmission data to the destination processor, said transmitter comprising:
         a read address translating circuit for translating the logical address to a specific physical address to be used as a read address to read the transmission data from a memory to allow for the transmission data to be transmitted to the destination processor, said transmitter configured to transmit the packet for requesting address translation to the destination processor before the read address translating circuit translates the logical address to the specific physical address to be used as the read address to read the transmission data from the memory; and
      b) a receiver for receiving a packet that includes a particular write address, and for translating the particular write address from a particular logical address to a particular physical address, and for using the particular physical address that results from the address translation as a specific write address for writing particular transmission data received subsequent to said particular packet to a particular memory.

* * * * *